United States Patent [19]

Ufrecht et al.

[11] Patent Number: 4,509,293
[45] Date of Patent: Apr. 9, 1985

[54] VEHICLE DOOR, IN PARTICULAR FOR PASSENGER MOTOR CAR

[75] Inventors: Martin Ufrecht; Heinz Rest, both of Cologne, Fed. Rep. of Germany

[73] Assignee: Ford Motor Company, Dearborn, Mich.

[21] Appl. No.: 503,939

[22] Filed: Jun. 13, 1983

[30] Foreign Application Priority Data

Jul. 21, 1982 [DE] Fed. Rep. of Germany ....... 3227153

[51] Int. Cl.³ .............................................. B60J 5/04
[52] U.S. Cl. ......................................... 49/502; 49/374
[58] Field of Search ................. 49/502, 374, 375, 440, 49/227

[56] References Cited

U.S. PATENT DOCUMENTS 4,417,419 11/1983 Rossie et al. .................... 49/485 X
4,418,498 12/1983 Wanlass et al. .................. 49/375 X

FOREIGN PATENT DOCUMENTS 2231533 12/1974 France ................................. 49/502

Primary Examiner—Kenneth Downey
Attorney, Agent, or Firm—Daniel M. Stock; Clifford L. Sadler

[57] ABSTRACT

In a vehicle door and in particular that of a motor car, which consists of at least an inner sheet and an outer sheet and in which these sheets are spot welded together along the door outer periphery and around the window opening, particularly the upper frame part of the vehicle door is made up of areas of the inner and outer sheets which at their inner flanges are approximately normal to the window plane of a movable window pane and at their outer flanges are parallel to the edges of the window pane which overlaps them and thus form supporting lips for window pane guides and/or seals.

7 Claims, 10 Drawing Figures

VEHICLE DOOR, IN PARTICULAR FOR PASSENGER MOTOR CAR

FIELD OF INVENTION

The invention relates generally to a vehicle door of the type in which under and outer sheets of metal are spot welded together around the outer periphery of the door.

DESCRIPTION OF THE PRIOR ART

From European Patent Application Nos. 00 40 587 and 00 40 588, vehicle doors are known in which an inner metal sheet is joined to an outer metal sheet by rims along the flanges of the outer door surround and joined by spot welding along the flanges of the window opening area. These flanges extend principally parallel to the outer contours of the vehicle door.

These known vehicle doors have the disadvantage that the outer sheet must be produced by an expensive press operation and must be joined to the more simply produced inner sheet by means of an expensive rim turning process along the outer door surround so that a spot welding operation can only be carried out along the simple flange provided around the window opening. Guides are provided for the lowerable side window at the window opening area to enable the closest possible snug or flush fit of the window to the outer contours of the frame part of the vehicle doors.

From German Laid-Open Specification No. 31 04 681, a vehicle door is known, particularly for passenger motor cars, in which a frame part formed from profiled sections is fastened to a lower carrier plate formed as a sheet metal stamping, so that other accessories can be mounted on the carrier plate such as the window lever mechanism, the door lock and its actuating links and the like so the preassembled unit so constructed is completed to make up a finished vehicle door by subsequent mounting of an inner and outer skin.

This known vehicle door has the disadvantage that through the separate formation of the lower carrier plate and upper frame, considerable variations in the finishing tolerances occur which can lead to sealing problems in the completed vehicle door within the door opening of the car body.

The automotive body work specialist has endeavored to overcome these difficulties in giving preference to vehicle doors comprising a single inner sheet and a single outer sheet and which at the same time form the upper frame part for the lowerable side window. The disadvantage of such vehicle doors was a somewhat awkward appearance since the upper part made of stamped metal sheets form a relatively wide mounting for the lowerable side window.

SUMMARY OF THE INVENTION

Starting from the vehicle doors described above, the object of the invention is to create an improved vehicle door, the main structure of which is made up of two relatively simple stamped sheet metal parts which can be joined together along a surrounding flange by simple spot welding operations and the upper frame part of which is completely covered by the side window when the window is raised and yet appears stylistically beyond reproach when the window is lowered, and the lower body part of which is made up of an inner and outer lining, which are detachably fixed in a known manner so that a perfect stylistic appearance of the edges of the vehicle door is achieved without the need for an expensive rim turning process.

The arrangement of the lowerable side windows is such as to overlap the upper part of the frame which renders it possible in a four door vehicle for the B pillar to be covered by the adjacent side windows.

Inasmuch as the areas forming the upper frame part of the inner and outer skins are almost normal at their inner flanges to the plane of a movable side window and extend parallel at their outer flanges to the edges of the window pane overlapping the flanges to form supporting lips for mounted window guides and/or seals, a simply produced connection of the inner and outer metal sheets which make up the main structure of the vehicle door is achieved; and, furthermore, by means of the mounted window guides and seals, the guides affixed to the contours of the body work ensure that the upper frame part is overlapped by the movable side window. Further still, as a result of this construction, the appearance of the upper frame part of the vehicle door remains beyond reproach when the window is lowered.

Inasmuch as the inner metal sheet forms an outwardly open shell, which in the area of the upper frame part has a profiled region with a deeper generally U-shaped cross-section which is closed off to a box shape by a shallower approximately U-shaped cross-section angular area of the upper frame part of the outer sheet metal, a sturdier upper frame part of the vehicle door is formed which directly cooperates with the sealing arrangements mounted on the spot-welded lips on the body work opening and makes for a secure sealing of the vehicle door with the door opening area in the body work.

Inasmuch as inner and outer metal sheets are provided with a further opening below the window opening which can be used as assembly access and thus form a lower frame part which both in the convex curvature as well as in the upper parts can be extended with enlarged cross-sections which can act as side protection reinforcements. Window actuating equipment can be mounted on the inner flange areas of this lower frame part and inner and outer detachable linings can be fixed on the outer flange areas. A vehicle door is thus created, the main structure of which forms two simple stamped sheet metal parts joined together and which are spot welded together and which as a result of the inner and outer lining parts offer versatile variation possibilities in production.

Inasmuch as the window pane guide and sealing strips mounted on the supporting lips of the inner and outer metal sheets are provided with the corresponding grooves to be fixed on the flanges of the main structure of the vehicle door, and have resilient hollow cavities for the sealing and textile padding for the reduction of the sliding friction, all requirements relating to the guiding and sealing of the lowerable side window are fulfilled.

The guides and seals for the window pane which are fixed to the main structurte of the vehicle door can cooperate with edge strips having a double U-shaped cross-section and fixed continuously to the pane edge or can work only with appropriate guide clips placed at intervals along the pane.

The presentation of the window guides and/or seals can take into account styling points of view so that when the window is down, the revealed guides and/or seals form, for example, a smooth longitudinal ridge along the frame part.

BRIEF DESCRIPTION OF THE DRAWINGS

The invention is described in greater detail with the help of the embodiments shown in the drawings.

It shows.

DESCRIPTION OF THE PREFERRED EMBODIMENT

Figure 1:
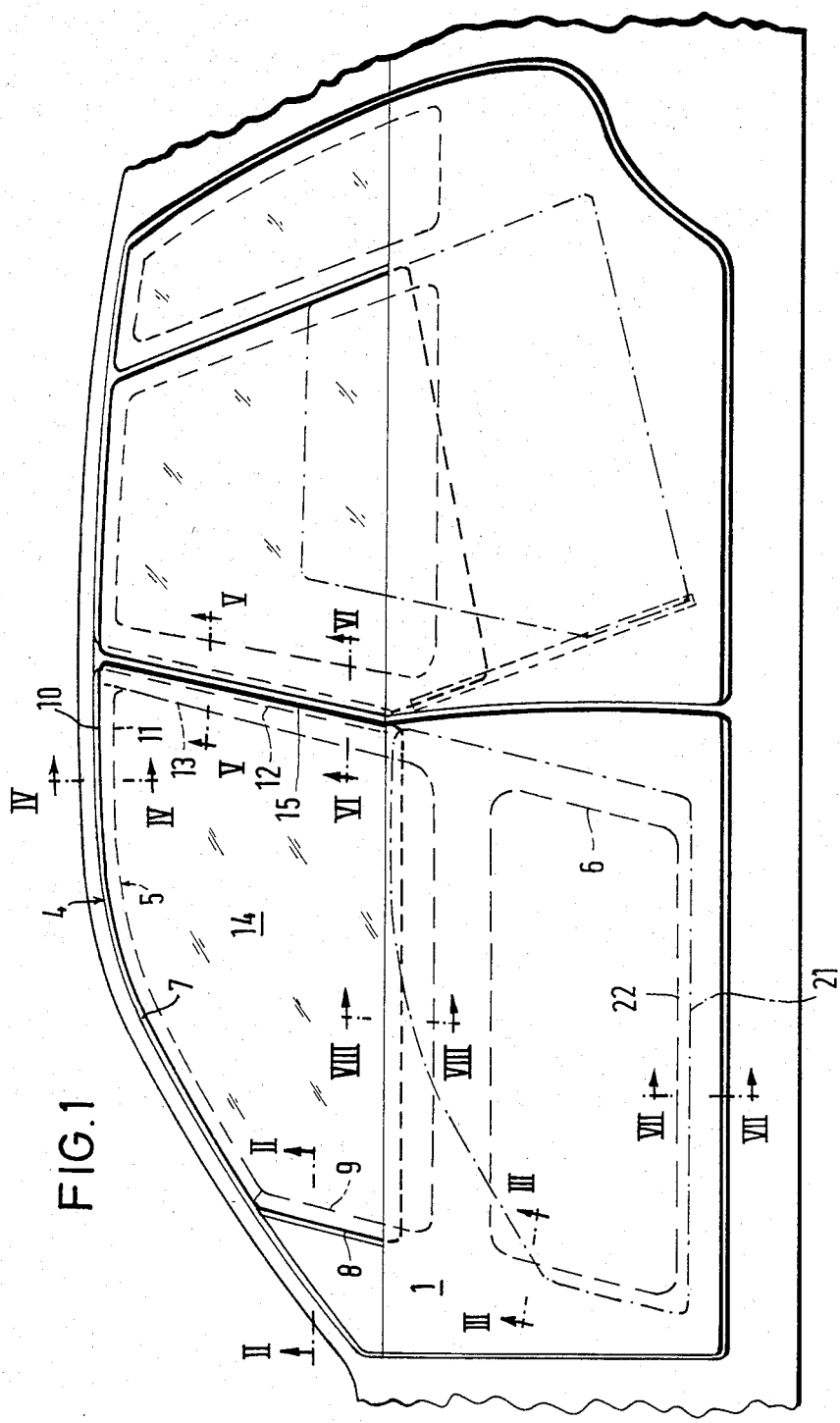
FIG. 1 is a schematic side view of a vehicle door of a four door motor vehicle body in which the various sections are indicated at the edge areas of the vehicle door.
Figure 2:
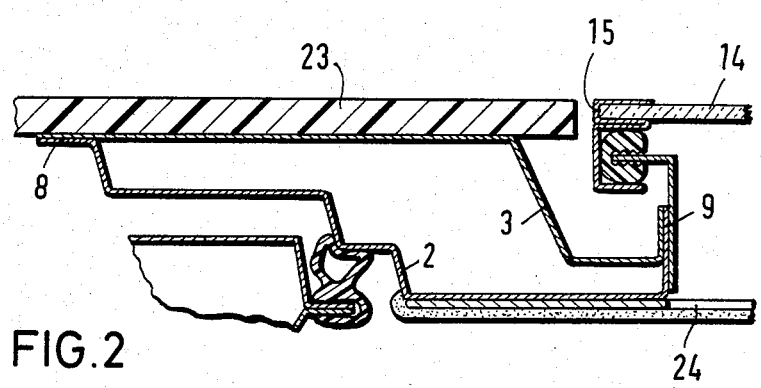
FIG. 2 is a horizontal section along line II—II.
Figure 3:
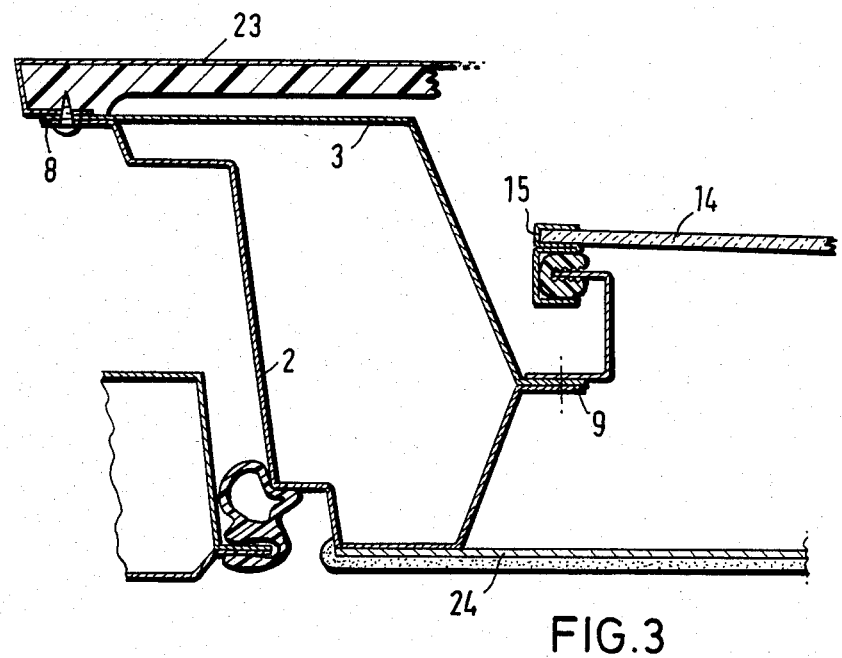
FIG. 3 is a horizontal section along line III—III.

The vehicle door 1 consists primarily of an inner metal sheet 2 and an outer metal sheet 3 which are spot welded together along flanges extending around the outer door periphery 4 and around the periphery of the window opening 5 and when appropriate around the periphery of a further opening 6. The parts of the inner sheet 2 and outer sheet 3 which make up the windor frame and/or the upper frame part 7 of the vehicle door 1 have front, inclined outer and inner flange areas 8 and 9, upper, horizontal outer and inner flange areas 10 and 11 and rear, vertical outer and inner flange areas 12 and 13.

As can be seen in particular from FIGS. 2 to 5, the inner flange areas 9, 11 and 13 extend normal to the plane of the glass of a lowerable window 14 while the outer flange areas 8, 10 and 12 extend parallel to the edges 15 of the window glass 14 which overlaps the flanges to form channels for mounted glass guides and seals 16 and 17, respectively, and serves for the mounting of an external mirror bracket.

The areas of the inner sheet 2 and the outer sheet 3 which form the upper frame part 7 of vehicle door 1 are constructed in such a way that the inner sheet 2, in the region of the window opening, has a deep, roughly U-shaped cross-section while the outer sheet 3 has a shallow, roughly U-shaped cross-section and compliments inner sheet 2 to form a box support. The upper frame part 7 of vehicle door 1 can thus be adequately and rigidly constructed resulting in good sealing being achieved at the usual spot welding channels at which the seal arrangements are fixed on the body work.

Figure 8:
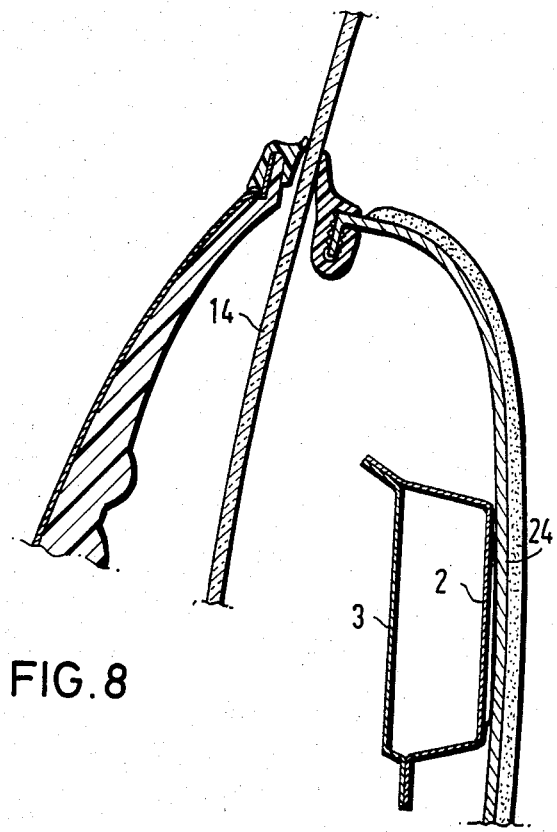
FIG. 8 is a vertical section along line VIII—VIII.

The vehicle door 1 may also have a further opening 6 near the window opening area under the belt line as indicated by the broken line in FIG. 1, which can be used, for instance, as assembly access. The flanges can be positioned in a similar way as at the window opening area and can be joined together by spot welding. As can be seen from FIGS. 8 and 9, the lower frame part formed this way can be extended at the breast convex curvature areas to form side protection reinforcements. The one-part construction of the inner sheet 2 and the outer sheet 3 as large sheet metal stampings facilitates the fixing of an appropriate large side box support.

Figure 4:
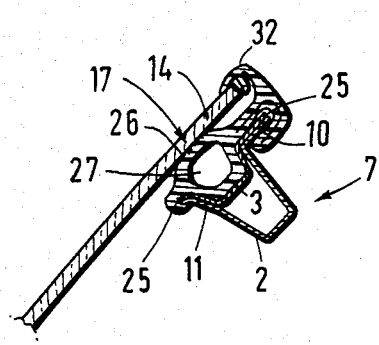
FIG. 4 is a vertical section along line IV—IV.
Figure 5:
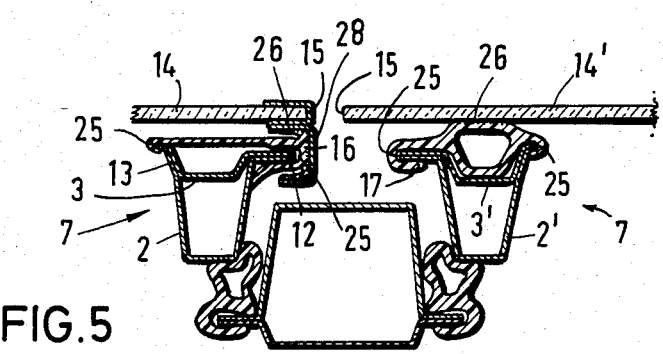
FIG. 5 is a horizontal section along line V—V.
Figure 6:
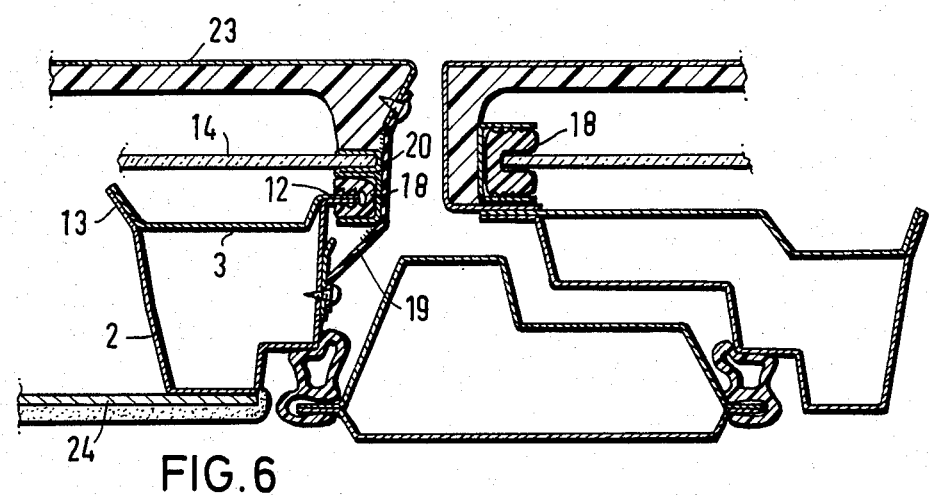
FIG. 6 is a horizontal section along line VI—VI.

As can be deduced from a comparison of FIGS. 4 and 5 with FIG. 6, only at upper frame part 7 are different window guides and seals 16, 17 fitted, with the corresponding expense, since at these points they are visible when the window is lowered whereas they are reduced to simple guides 18 within the door body work proper.

A further special characteristic is worthy of mention in FIG. 6. Inasmuch as the lowerable window 14 overlaps the upper frame part 7 of the vehicle door 1 and may be arranged in such a way as to cover the whole of the B pillar, adequate room must be ensured within the door body to accommodate it. In the present case, this is done by means of a soft pocket 20 of elastic material with an inner textile padding 19 which in the region of the door edge is fixed on the one hand to an outer lining part 23 and on the other hand to an inner lining part 24.

Figure 7:
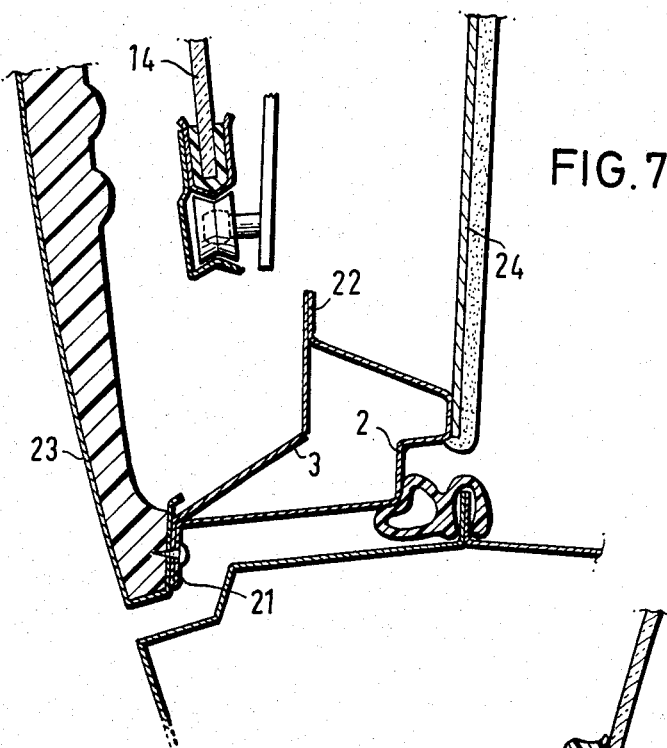
FIG. 7 is a vertical section along line VII—VII.

As can be seen from FIG. 7, the inner sheet 2 and outer sheet 3 can form a bottom side support reinforcement, the outer flange area 21 of which can serve as mounting for an outer part 23, for example in the form of a sandwich unit, while on its inner flange area 22 at the level of the upper support, a schematically shown window lever mechanism can be fixed. An inner lining part 24 can be mounted on the inner sheet in a known manner.

As can be seen from FIGS. 4 and 5, either a window guiding strip 16 or a window guiding and sealing strip 17 can be used. Both strips 16 and 17 are provided with appropriate grooves or hooks 25 by means of which they can be fixed to the corresponding outer and inner flange areas 12 and 13. The window guide strips 16 as well as the window seal strips 17 are provided with a textile padding 26. In the case of the window seal strip 17, a resilient cavity 27 is provided which pushes the textile padding 26 against the window glass.

The guidance of window glass 14 takes place either as can be seen from FIG. 5 through an edge strip 28 which has a double U-shaped section and is fixed with its U-channel at the edge 15 of the window glass 14, while with its other U-shaped channel, it includes the guide region of the guide strip 16 and cooperates with this to facilitate sliding and sealing.

Figure 9:
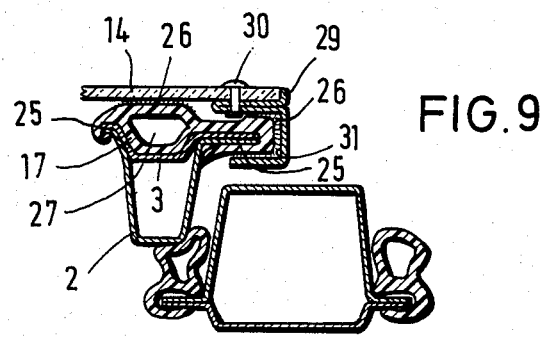
FIG. 9 is a similar section as in FIG. 5 with a guiding clip of a different type.
Figure 10:
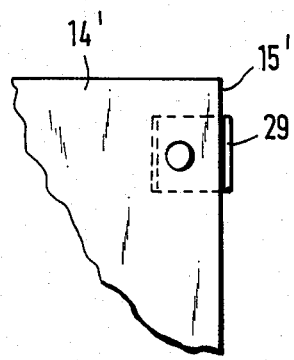
FIG. 10 is a view of the corner of the lowerable window corner with a guiding clip as in FIG. 9.

The guidance of the window glass 14' can, as can be seen on the right of FIG. 5 together with FIGS. 9 and 10, be carried out by a guide clip 29 at intervals along the edge 15' of window glass 14'. The clip can either be secured in place by glue or by a bolt 30 and has a U-shaped section 31 which includes the guide and seal strips 17. Since in this case no seal is achieved along the area of the edge of the glass 14', resilient cavity 27 is provided on the window guiding and sealing strip 17 which, by means of a textile padded 26 sealing area, pushes against the window glass 14'.

As can be seen from FIG. 4, a guide and seal 17' can be placed at the upper edge of the window glass 14 in a similar way as shown in FIG. 5 whereby at the upper part, where it overlaps the outer flange 10, swingable seal strip 32 can be provided. The groove 25 of the window guide and seal 17' prevents the seal from coming off when the window glass 14 is moved up.

The corresponding window guides and seals can be finished in their outwardly visible parts in such a way as to offer an appearance which withstands stylistic scrutiny when the window is wound down. There is, therefore, no need to apply color to the regions of the window glass overlapping the upper frame parts which, particularly in the case of the area of the upper edges or the window glass, would be visually unattractive when the window is partially lowered.

We claim:

1. A vehicle door, in particular for motor cars which consists of at least an inner metal sheet and an outer metal sheet and in which these sheets are spot welded together along the door outer periphery and, in an upper frame part of the door, along the flanges around the opening area for a lowerable window, characterized in that the portions of the inner and outer sheets forming the upper frame part extend approximately normal to the plane of the glass of the lowerable window at their inner flanges, and extend parallel to the edges of the window glass at their outer flanges, the window glass being positioned to overlap the inner and outer flanges, thereby forming supporting channels mounting window glass guides and/or seals, and that the inner sheet forms an outwardly open shell which in the area of its upper frame part has a deep U-shaped cross-section profile which is closed by a shallow profiled region, approximately U-shaped in cross-section, formed on the outer sheet in the region of the upper frame part.

2. A vehicle door according to claim 1, characterized in that the door has a convex outside curvature and both the inner and outer sheets are provided below the window opening with a further opening adapted to be used as an assembly opening, and which forms a lower frame part constructed at its middle area and at the convex curvature area as a protective side reinforcement and at the outer flange area of which an outer lining part can be fixed.

3. A vehicle door according to claim 1, characterized in that window glass guides and seals are mounted on the supporting channels and are provided with corresponding receiving grooves and resting hooks, respectively.

4. A vehicle door according to claim 3, characterized in that a seal strip member including a resilient cavity is mounted on supporting lips defined on the supporting channels to engage the inner surface of the lowerable window.

5. A vehicle door according to claim 4, characterized in that textile padding is provided adjacent the supporting channels.

6. A vehicle door according to claim 5, characterized in that guide clips are fastened at intervals on the glass to cooperate with the window glass guides and seals mounted on the supporting channels.

7. A vehicle door, in particular for motor cars, which consists of at least an inner metal sheet and an outer metal sheet and in which these sheets are spot welded together along the door outer periphery and, in an upper frame part of the door, along the flanges around the opening area for a lowerable window, characterized in that:

the portions of the inner and outer sheets forming the upper frame part extend approximately normal to the plane of the glass of the lowerable window at their inner flanges, and extend parallel to the edges of the window glass at their outer flanges, the window glass being positioned to overlap the inner and outer flanges, thereby forming supporting channels mounting window glass guides and/or seals;

the inner sheet forms an outwardly open shell which in the area of its upper frame part has a deep U-shaped cross-section profile which is closed by a shallow profiled region, approximately U-shaped in cross-section, formed on the outer sheet in the region of the upper frame part.

window glass guides and seals are mounted on the supporting channels and are provided with corresponding receiving grooves and resting hooks, respectively;

a seal strip member including a resilient cavity is mounted on supporting lips defined on the supporting channels to engage the inner surface of the lowerable window;

textile padding is provided adjacent the supporting channels; and edge strips fastened to the glass along its vertical edges and having a double U-shaped cross-section are provided for cooperation with the window glass guides and seals mounted on the supporting channels.

* * * * *